United States Patent [19]

Hawker

[11] Patent Number: 5,007,455
[45] Date of Patent: Apr. 16, 1991

[54] PILOT-OPERATED HYDRAULIC ANTILOCK MODULATOR

[75] Inventor: Michael J. Hawker, Lincoln, United Kingdom

[73] Assignee: Clayton Dewandre Co., Ltd., Lincoln, United Kingdom

[21] Appl. No.: 311,319

[22] Filed: Feb. 15, 1989

[30] Foreign Application Priority Data

Feb. 15, 1988 [GB] United Kingdom ............... 8803434

[51] Int. Cl.$^5$ ............................................. F15B 13/043
[52] U.S. Cl. ........................ 137/596.16; 137/596.18; 137/627.5; 303/119
[58] Field of Search ........................ 137/596.16, 596.18, 137/627.5; 303/119

[56] References Cited

U.S. PATENT DOCUMENTS

| 3,814,134 | 6/1974 | Vanti | 137/627.5 |
| 4,071,046 | 1/1978 | Cates | 137/627.5 X |
| 4,117,865 | 10/1978 | Beck | 137/627.5 |
| 4,486,053 | 12/1984 | Hawker et al. | |

FOREIGN PATENT DOCUMENTS

| 0218823 | 4/1987 | European Pat. Off. | |
| 288252 | 10/1988 | European Pat. Off. | 303/119 |
| 2437060 | 2/1976 | Fed. Rep. of Germany | |
| 2855876 | 7/1980 | Fed. Rep. of Germany | 303/119 |
| 3601833 | 7/1986 | Fed. Rep. of Germany | |
| 2059528 | 4/1981 | United Kingdom | 303/119 |

Primary Examiner—Gerald A. Michalsky
Attorney, Agent, or Firm—Horst M. Kasper

[57] ABSTRACT

A pilot-operated hydraulic control valve for use in conjunction with a solenoid modulator to provide brake pressure modulation on heavier vehicles, particularly in so-called automotive anti-lock systems. The pilot-operated slave unit has an inlet valve operable by travel of one piston and an exhaust valve operable by travel of another piston. One is a main piston which travels in response to pilot signal pressure and during part of its travel controls travel of the other piston, and an auxiliary piston, away from a stopped position towards which the auxiliary piston is biased. Thus, the valve has three distinct and stable positions (supply to delivery, delivery held, and delivery to exhaust), determined by the pilot signal pressure and the effort travel characteristic. It can, therefore, imitate as a slave unit, the pressure modulations of a three-state antilock solenoid valve but with increased fluid flow.

43 Claims, 4 Drawing Sheets

PILOT-OPERATED HYDRAULIC ANTILOCK MODULATOR

FIELD OF THE INVENTION

The present invention relates, in general, to fluid pressure control valves and, more particularly, this invention relates to a pilot-operated hydraulic control valve.

BACKGROUND OF THE INVENTION

Prior to the present invention, it is well known in the automotive brake pressure modulation systems, or so-called anti-lock brake systems, to include a solenoid valve. However, different designs are required for such solenoid valves. These designs usually depend to a large extent upon the particular application of the anti-lock brake system; for example, whether a light or a heavy duty brake system is required on the particular vehicle of such system to be used.

See, for example, European patent application EP-A-288252, which relates to a solenoid valve that is suitable for service on lightweight vehicles. European patent application EP-A-288252 corresponds to U.S. patent application Ser. No. 184,738, now U.S. Pat. No. 4,875,742, which was issued on Oct. 24, 1989. The teachings in the above-referenced U.S. patent application Ser. No. 184,738, now U.S. Pat. No. 4,875,742, are incorporated herein by reference thereto. On the other hand, for heavier weight vehicles, an increased fluid flow is normally required for effective system operation. For this purpose, it is common practice to use larger flow solenoid valves. One example of such larger flow solenoid valves is taught in European patent application EP-A-0051965, European patent application EP-2-0051965 corresponds to U.S. Pat. No. 4,486,053, the disclosure of which is also incorporated herein by reference thereto. The solenoid valves taught in patent application EP-A-0051965 are pressure balanced so as to keep current values down to a reasonable and sensible level during operation of the braking system.

SUMMARY OF THE INVENTION

The present invention provides a pilot-operated hydraulic modulator which includes the provision for supply of, delivery of, and exhaust flows of hydraulic fluid. This pilot-operated hydraulic modulator includes a housing member having a main piston means disposed for reciprocal movement therein. An auxiliary piston means is also disposed for reciprocal movement within such housing member. The auxiliary piston means moves in response to a predetermined movement of the main piston means. An inlet valve means is provided which operates in response to travel of one of the main piston means and the auxiliary piston means. The inlet valve means controls fluid communication of hydraulic fluid between a supply and a delivery fluid communication port. Further, an exhaust valve means is provided which operates in response to travel by the opposite one of such main piston means and the auxiliary piston means. This exhaust valve means controls fluid communication of hydraulic fluid between the delivery and exhaust fluid communication ports. The main piston means travels in response to a pilot signal pressure and during a portion of its travel, such main piston means controls the travel of the auxiliary piston means away from a stopped position towards which the auxiliary piston means is biased.

OBJECTS OF THE INVENTION

It is, therefore, one of the primary objects of the present invention to provide an alternative means of brake pressure modulation on heavier vehicles using a light duty solenoid valve.

Another object of the present invention is to provide a hydraulic control valve that is pilot-operated by a light vehicle solenoid valve to produce an increased hydraulic fluid volume required for heavier vehicles, thereby enabling only a single solenoid valve design to be used for a range of vehicle weights in a manner such that the solenoid valve can be used by itself at the light end and as a pilot valve at the heavy end.

The above objects and advantages of the present invention, as well as various other objects and advantages of the pilot-operated hydraulic control valve, will become more readily apparent to those persons who are skilled in the control valve art, from the following much more detailed description of the invention when such description is taken in conjunction with the attached drawings and with the appended claims.

BRIEF DESCRIPTION OF THE INVENTION

Figure 2:
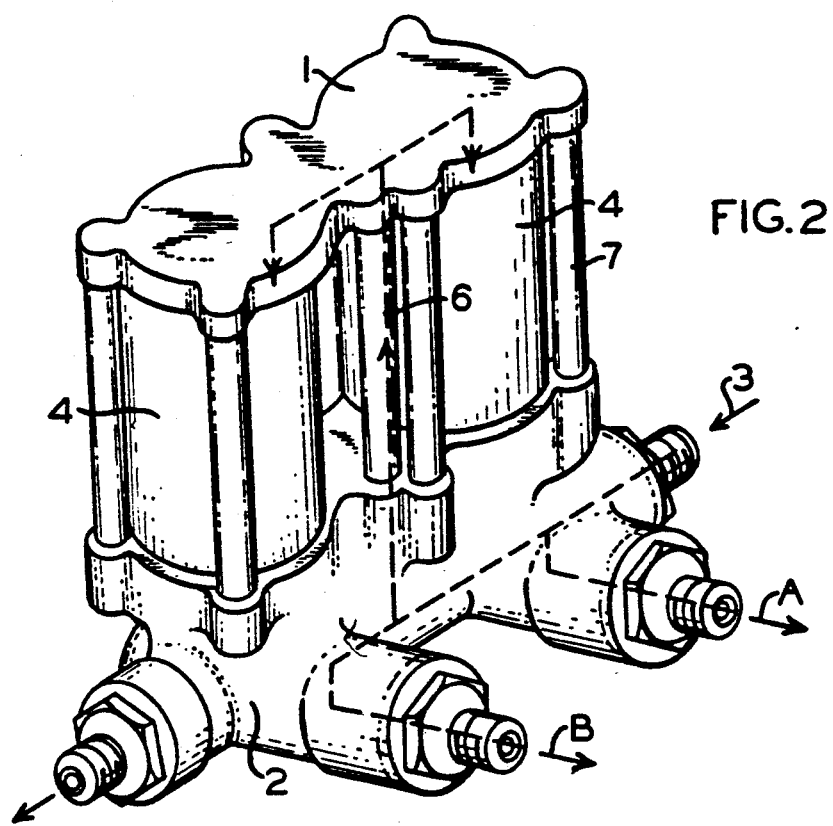
FIG. 2 is a perspective view of the assembly illustrated in FIG. 1.

Prior to proceeding to the detailed description of the present invention, it should be noted that identical components have been indentified with identical reference numerals throughout the several views of the attached drawings.

Figure 1:
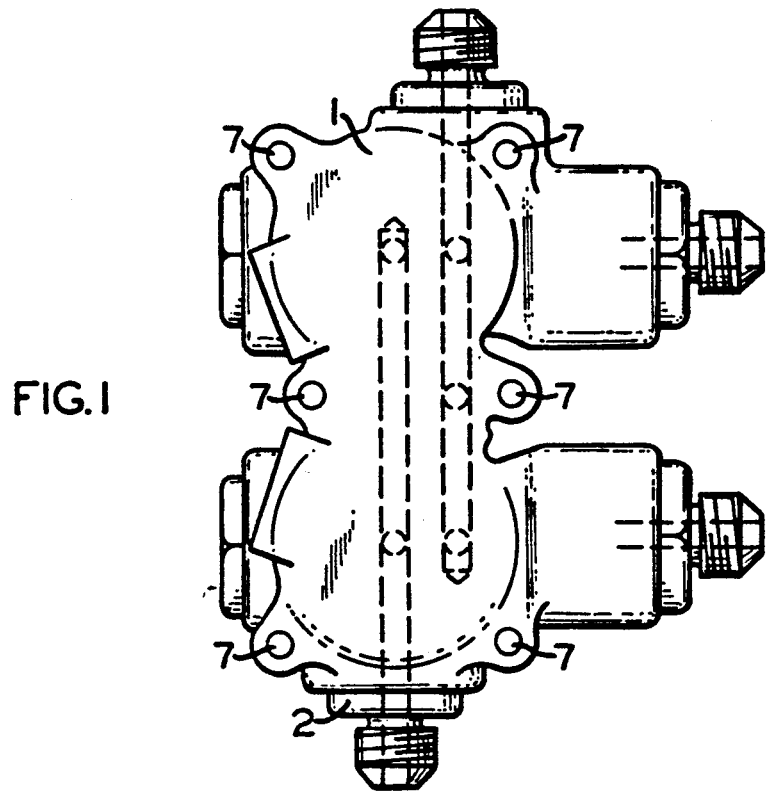
FIG. 1 is a plan view of one presently preferred assembly of two solenoid-operated control valves in which each control valve has its own pilot-operated modulator.

Now refer more particularly to the assembly shown in FIGS. 1 and 2. As illustrated, this assembly includes two solenoid-operated pilot valves and pilot-operated modulator combinations. These combinations are capable of providing antilock control for a complete axle of a vehicle with a vertical split braking system front to rear. Each solenoid valve functions as a pilot valve which controls the slave modulator so that the assembly takes advantage of the fast performance of the solenoid valve and large hydraulic fluid flow capacity of the modulator.

Figure 3:
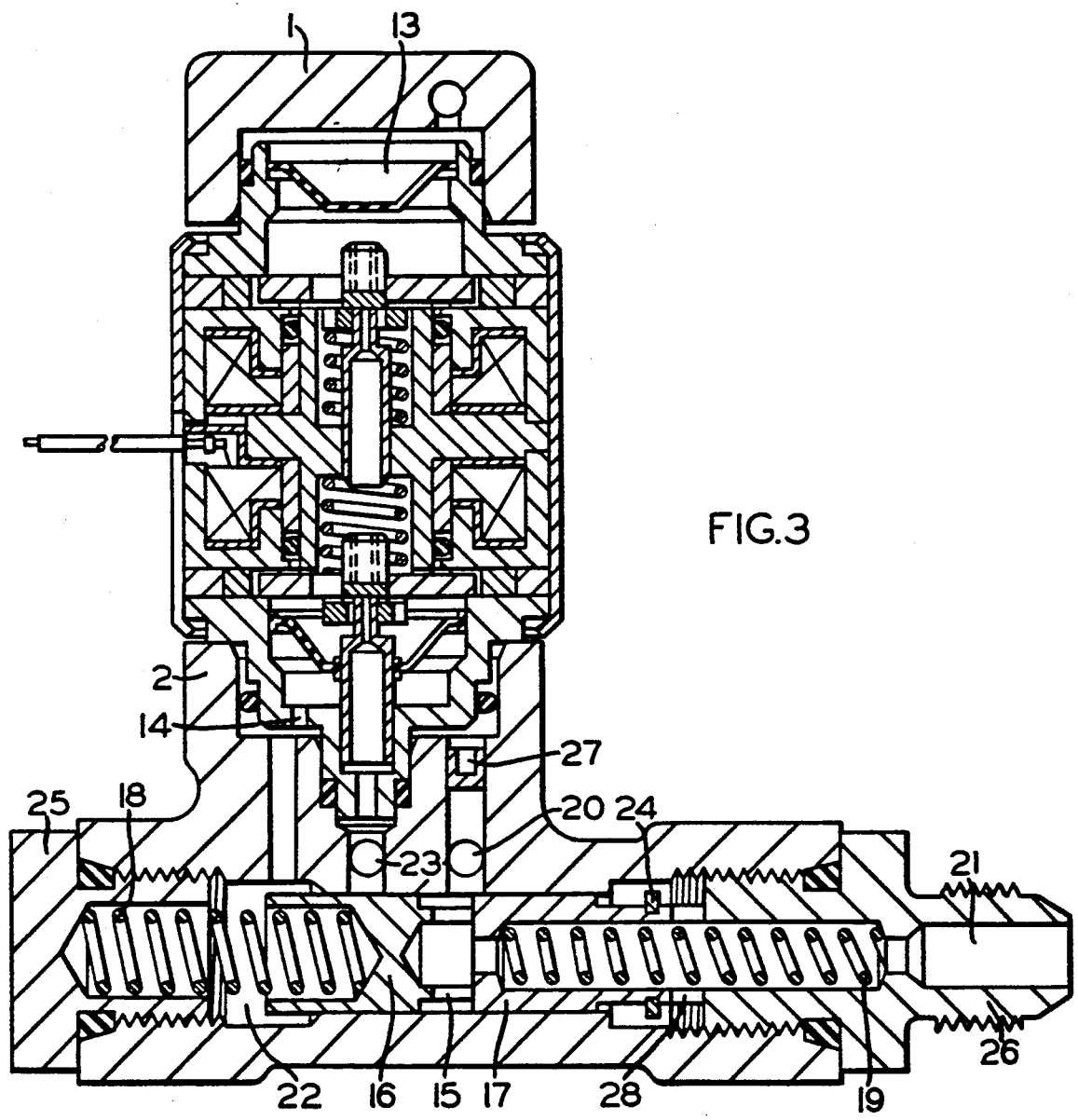
FIG. 3 is a cross-sectional view of one of the solenoid valve and modulator combination.

When used for modulation of automotive brake pressure in an antilock braking system, the assembly of FIGS. 1 to 3 is inserted in the fluid pressure communication feed line from the hydraulic (foot) brake valve to the brakes. The fluid pressure from the brake valve normally is fed to a supply port 3 and delivery to delivery ports (A) and (B) corresponding to the two wheel brakes of an axle assembly (not shown). The solenoid valves 4, each of which incorporates a normally open inlet valve and a normally closed exhaust valve, are retained by six studs 7 between a valve head 1 and a body 2 containing the associated pilot-operated modulators. Brake valve pressure applied at the supply port 3 is fed through a stack pipe 6 and along a bore drilled in the valve head 1 to enter the inlet chamber 13 of each solenoid valve (FIG. 3).

The construction and operation of each solenoid valve 4 is as described in U.S. patent application Ser. No. 184,738, now U.S. Pat. No. 4,875,742, and will be summarized here only. The valve has three possible states according to electrical signals it receives from the control unit of the antilock braking system (not shown). These states are:

(a) the brake pressure at supply port 3 entering the (each) inlet chamber 13 passes through the normally open inlet valve to the solenoid delivery 14, (inlet valve open/exhaust valve closed);

(b) with supply pressure in the inlet chamber 13 rising, the solenoid delivery pressure 14 is held to a lower value, (inlet valve closed/exhaust valve closed); and (c) irrespective of the supply pressure 13 at the solenoid delivery pressure 13 is reduced by a certain amount by dumping hydraulic fluid through the exhaust valve to exhaust port 23 communicating with a reservoir circuit (not shown), (inlet valve closed/exhaust valve open).

Referring now to FIG. 3, each pilot-operated modulator housed in the body 2 includes a main piston 16 which serves as the spool of an exhaust valve and is referred to as the exhaust piston, the piston 16 being slidable within the body 2 to open and close the exhaust port 23, and an auxiliary piston or spool 17 which cooperates in a similar way with the supply port 20 to form a delivery valve and hence is referred to as the delivery piston. A circular lip or the like 24 provides a stop. Such stop limits travel of the delivery piston 17 leftwards in FIG. 3. Solenoid delivery pressure 14 is fed via a bore drilled in the body 2 to a chamber 22 containing a spring 18 for biasing the exhaust piston 16 and provides pilot signal pressure to act on the left-hand end of the exhaust piston 16. The delivery piston 17 is biased in the opposite direction, toward its stopped position by a spring 19 which is weaker than the spring 18. Thus, the combined effort of the two springs 18 and 19 produces a resultant rightwise force tending to hold the two pistons in abutment (as shown) via a slotted spacing ring 15 carried by the exhaust piston 16. The delivery piston 17 abuts also via a slotted ring 28, a fitting 26 incorporating a brake pressure delivery port 21 in communication through the delivery piston 17 with the space between the two pistons 16 and 17.

Where the solenoid valve is to be used directly (solo), these three states would relate to the three braking pressure conditions for antilock modulation;

(a) pressure to brakes;
(b) pressure at brakes held; and
(c) pressure at brakes dumped.

In this case, (b) and (c) will normally be concerned with pulsing the pressure up or down according to wheel skid. In the embodiment of FIGS. 1 to 3, the solenoid valve 4 operates in the same way but as a pilot with the slave modulator producing the variation of brake pressure according to wheel skid.

When no electrical signals are applied to the solenoid valve (condition(s) above), supply pressure 20 passes through the open delivery piston/valve and the slotted ring 15, the delivery piston 17, and to the delivery port 21. It also passes up the stack pipe 6 (FIG. 2) through the normally open solenoid inlet valve to provide pilot signal (solenoid delivery) pressure 14 in chamber 22, and since the pilot signal pressure 14 is in this condition equal to the supply pressure acting in the space between the two pistons, produces a pressure balance across the exhaust piston 16 which remains in the position shown, together with the delivery piston 17 by the resultant effort of the two springs 18, 19. The typical force to move the exhaust piston 16 leftwise is shown in FIG. 5, but with typical but not exclusive travels.

Travel of the exhaust piston 16 results from a pressure differential across it, and this arises in condition (b). Pressure in chamber 22 is held whilst pressure at 20 and 21 continues to rise, moving the exhaust and thence delivery piston 17 to close the port 20 and cut off the supply at about the 3 mm travel position; this is the antilock pressure hold condition. If wheel skid is still present, then the solenoid valve 4 further reduces the pressure in chamber 22, condition (c), and the increased pressure differential moves the exhaust piston 16 further leftwise to open the port 23 to exhaust, thus dumping hydraulic pressure from the brakes 21.

Figure 5:
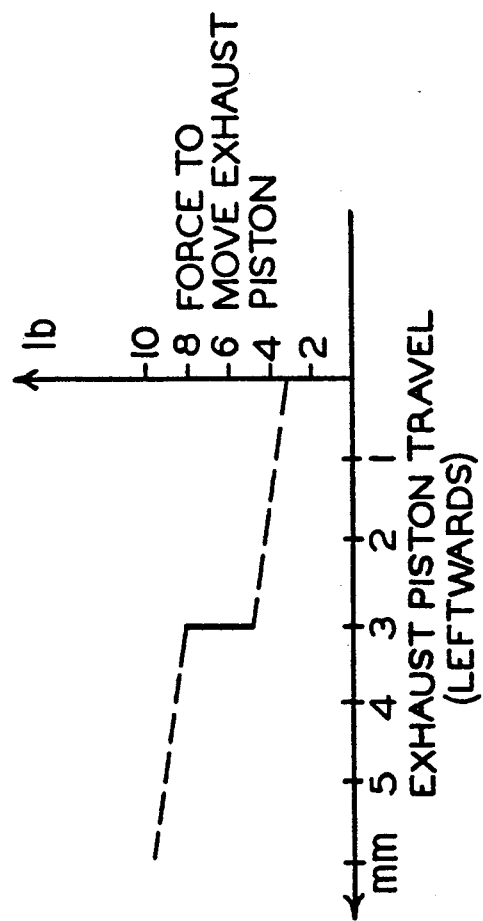
FIG. 5 is a graph which illustrates an exhaust piston travel characteristic of a typical pilot-operated modulator according to the present invention.

The typical travel of the exhaust piston 16 is now greater than (about 6 mm) travel of the delivery piston 17 (about 3 mm) because of the circular lip stop 24, thus producing the typical step in the force diagram of FIG. 5.

The fit of the pistons 16 and 17 in their bore must be precise to avoid unnecessary leakage of hydraulic fluid from the pressurized circuit to the return circuit; but if this does happen, the pistons 16 and 17 will always strive to maintain the brake pressure delivered at port 21 equal to the solenoid valve pressure at chamber 22, allowing the small operating differential; and during an antilock pulsing sequence, the brake pressure delivered at port 21 will follow the electrical solenoid signals. Because the piston bores and travels are generous, the flow capacity is much greater than that possible with the solenoid valve solo where travels are limited by magnetic features such as pull and reach.

It is a basic requirement that braking systems release the brakes when the pedal effort is removed, even when the antilock signals are in the "hold" state. To achieve this, the solenoid valve has a one-way valve feature (see Items 30 and 48, FIGS. 1 and 3 of U.S. patent application Ser. No. 184,738 now U.S. Pat. No. 4,875,742. When the valve is used as a pilot, the valve modulator will automatically reproduce this feature due to operation of the balanced exhaust piston 16 as the hydraulic pressure at chamber 22 is dumped through the one-way feature and returned to the reservoir through port 23. It is often necessary to tune modulators to achieve the required pressure rise and decay rates; in the constructions of the slave modulator fitting of fluid restrictors at ports 20, 21 and 23 will suffice.

The body 2 may conveniently be made of iron and the fitment of end plug 25 will permit honing of the through bore for piston spool matching, the use of fitting 26 will permit a range of threads and connections and act as a piston stop, and the plug 27 is a convenient means of drilling and blocking of the delivery porting.

The pistons have end slots incorporated to permit hydraulic fluid flow when they are against their end stops.

Figure 4:
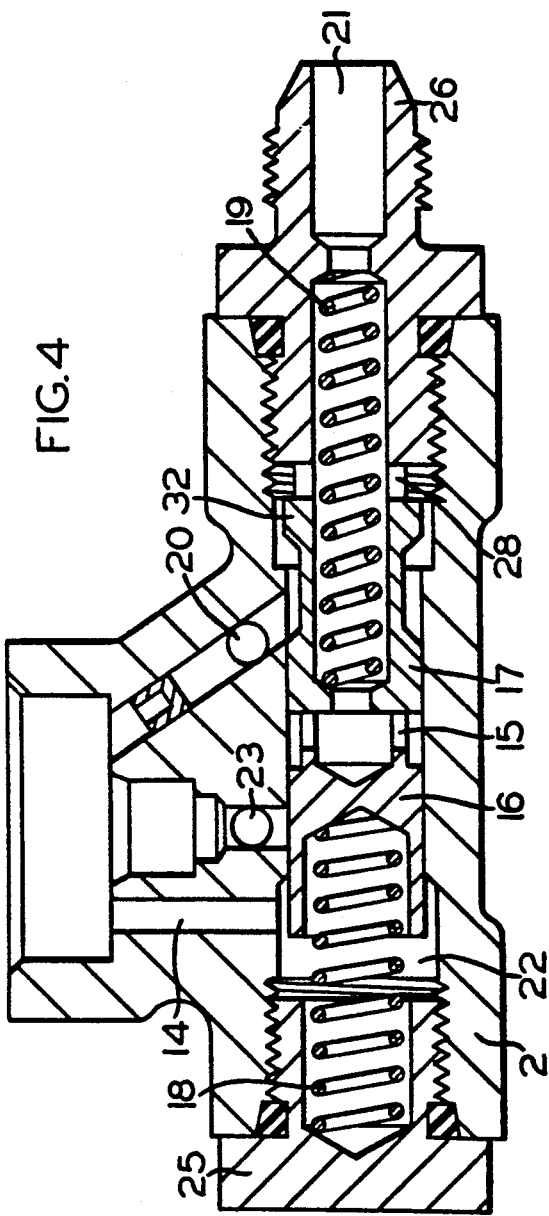
FIG. 4 is a cross-sectional view of an alternative embodiment of a pilot-operated modulator assembly.

FIG. 4 shows an alternative design for the delivery piston 17, which includes a mushroom valve head 32 cooperating with a valve seat on the body 2 to form a seated delivery valve instead of the spool-type shown in FIG. 3. The arrangement could be faster in response due to shorter travels, but is possibly more expensive. The seated delivery valve determines the stopped position of the delivery piston without the need for a separate delivery piston stop.

Figure 6:
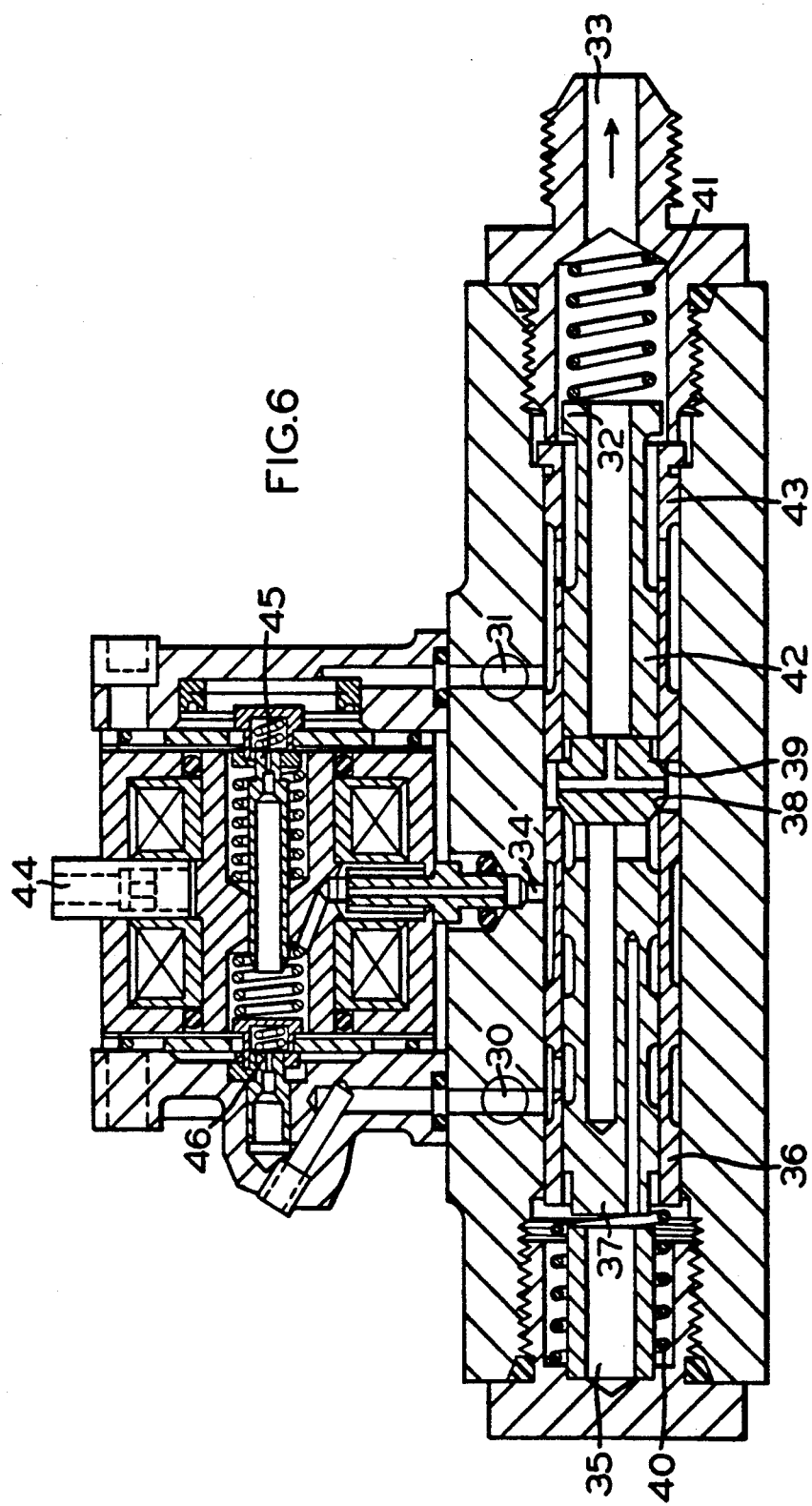
FIG. 6 is a cross-sectional view of another alternative embodiment of a solenoid pilot valve and pilot-operated modulator combination.

The solenoid valve/pilot-operated modulator combination shown in FIG. 6 is, in principle, the same as embodiments described above with reference to FIGS. 1 to 3 and FIG. 4. However, a different and improved configuration of solenoid valve is used, this having built-in pressure containment and a face-type connection with the pilot-operated modulator. Also, the pilot-operated modulator includes a poppet (seated) inlet and exhaust valves rather than the poppet/spool arrangement of FIG. 4.

It includes a main piston slidable within a bore in the valve body and comprising an outer spool 36 and an inner spool 37 slidable within the outer spool 36 which is biased by spring 40. The auxiliary or delivery piston is in the form of a spool 42 which is slidable within a spool 43 fixed in the bore; the outside diameter of the spool affording a convenient way of achieving a static sealing means since the spool bore (also used for outer spool 36) already exists. A mushroom head 32 of the spool 42 cooperates with the end of fixed spool 43 to form a delivery poppet valve. Also, a head 38 at the end of the spool 37 cooperates with the outer spool 36 of the main piston to form an exhaust poppet valve. Spring 41 biases the spool 42 toward the seated (closed) position of the delivery poppet valve; this determines the stopped position of the spool 42 (the auxiliary piston).

Referring to FIG. 6, the operation is as follows: Hydraulic fluid pressure from a brake valve (not shown) enters at 31 and passes the open delivery poppet at head 32 and thence to brakes via outlet 33. Hydraulic fluid from the brake valve also passes through the normally open modulator inlet valve 45 to be delivered as a pilot signal to port 34, and then on to chamber 35 where it acts across the combined areas of 37 and the inner spool 37 and the outer spool 36 and is, in turn, balanced by the same value of pressure from the brake delivery port 33 which acts at exhaust poppet 38. There is an oil passageway 39 communicating with the valve body bore, but pressure cannot pass the closed exhaust poppet 38 since spring 40 is more powerful than spring 41 to maintain the position shown. The resultant spring load also urges spool 42 within the fixed spool 43 to maintain the open poppet at delivery poppet 32. If an antilock signal is received at input 44, then the modulator inlet valve 45 closes and the exhaust valve 46 is pulsed open reducing the pilot pressure 34 relative to hydraulic pressure at inlet 31, this moves spools 37, 36 and 42 leftwards closing the delivery poppet 32 and opening the exhaust poppet 38 since spool 37 bottoms before spool 36. With the exhaust poppet 38 momentarily open, the pressure at outlet 33 is rebalanced to equal the pressure in chamber 35, and, as modulation of pressure takes place, brake pressure 36 will follow to give the required antilocking.

It can be seen that the present invention provides a pilot-operated control valve having a main piston and an auxiliary piston wherein the main piston travels in response to pilot signal pressure, and, during part of its travel, controls travel of the auxiliary piston away from a stopped position toward which the auxiliary piston is biased.

At a given pilot signal pressure, the main piston moves the auxiliary piston against its bias to a first position. A certain reduction in the pilot signal pressure results in travel of the two pistons to a second position, at which point the auxiliary piston bias is transferred from the main piston to a stop resulting in a step in the effort needed to further move the main piston. The effect of this step in the main piston effort/travel characteristic is to make the second position stable. A certain further reduction of the pilot signal pressure will result in a third position at which point the main exhaust piston will have separated from the auxiliary piston.

In a preferred embodiment, the pilot-operated control valve has provision for supply, pilot signal (provided by a solenoid valve), delivery, and exhaust flows; the main piston being an exhaust piston and the auxiliary piston a delivery piston. The pilot signal and a biasing means preferably acts on one end of the main piston in opposition to the supply pressure acting on the other end of the main piston and also on both ends of the auxiliary piston. During part of its travel, the exhaust piston controls the travel of the delivery piston between an open (first) position wherein supply is connected to delivery, and the stopped (second) position wherein the supply is shut-off and delivery held, the remaining exhaust piston travel being to a (third) position wherein delivery is connected to exhaust.

As will be understood, such a valve has three distinct and stable positions (supply to delivery, delivery held, and delivery to exhaust), determined by the pilot signal pressure and the effort/travel characteristic of the two pistons. It can, therefore, imitate as a slave unit, the pressure modulations of a three-state antilock solenoid valve, but with increased fluid flow. Also, timing of the antilock/travel pressure modulation for speed of response and fluid flow is possible.

While a number of presently preferred embodiments of the pilot-operated hydraulic antilock modulator, according to the present invention, have been described above and illustrated in the attached drawings, it should be understood by persons skilled in the art that various modifications and adaptations of the invention are possible without departing from the spirit and scope of the attached drawings.

I claim:

1. A pilot-operated hydraulic modulator which includes a provision for each of a supply, a delivery and an exhaust flow of fluid, said pilot-operated hydraulic modulator comprising:
    (a) a housing member;
    (b) a main piston means disposed for reciprocal movement within said housing member;
    (c) a means for producing a pressure balance across said main piston means;
    (d) an auxiliary piston means disposed for reciprocal movement within said housing member, said auxiliary piston means moves in response to a predetermined movement of said main piston means;
    (e) an inlet valve means operable in response to said reciprocal movement of one of said main piston means and said auxiliary piston means for controlling fluid communication between a supply and a delivery fluid communication port;
    (f) an exhaust valve means operable in response to said reciprocal movement by an opposite one of said main piston means and said auxiliary piston means for controlling fluid communication between said delivery and an exhaust fluid communication port;

(g) biasing means engageable with said auxiliary piston means for urging said auxiliary piston means in a predetermined direction;

(h) means for supplying a pilot signal pressure to said main piston means, said main piston means moving in response to said pilot signal pressure and during at least a portion of its movement said main piston means controls movement of said auxiliary piston means away from a stopped position toward which said auxiliary piston means is biased; and (i) a biasing means engageable with said main piston means for urging said main piston means in a predetermined direction toward said auxiliary piston means.

2. A pilot-operated hydraulic modulator, according to claim 1, wherein said pilot-operated hydraulic modulator further includes in combination with a solenoid-operated inlet valve and a solenoid-operated exhaust valve, which together form a modulator for controlling fluid communication flows, respectively, between said supply and exhaust ports, a solenoid-operated delivery port connected to provide said pilot signal pressure to said main piston means in response to applied electrical solenoid input signals.

3. A pilot-operated hydraulic modulator, according to claim 2, wherein said solenoid-operated inlet valve is a normally open valve and said solenoid-operated exhaust valve is a normally closed valve.

4. A pilot-operated hydraulic modulator, according to claim 3, wherein said main piston means moves in response to said pilot signal pressure into abutment with said auxiliary piston means which in response to an increase in said pilot signal pressure then travels with said main piston means.

5. A pilot-operated hydraulic modulator, according to claim 3, wherein a valve operated by movement of said auxiliary piston means is a seated valve and a closed position of said seated valve determines said stopped position of said auxiliary piston means.

6. A pilot-operated hydraulic modulator, according to claim 3, wherein said exhaust valve is a spool valve and said main piston means forms a spool portion of said spool valve.

7. A pilot-operated hydraulic modulator, according to claim 2, wherein said inlet valve is a normally open valve and said exhaust valve is a normally closed valve.

8. A pilot-operated hydraulic modulator, according to claim 2, wherein said main piston means moves in response to said pilot signal pressure into abutment with said auxiliary piston means which in response to an increase in said pilot signal pressure then travels with said main piston means.

9. A pilot-operated hydraulic modulator, according to claim 2, wherein a valve operated by movement of said auxiliary piston means is a seated valve and a closed position of said seated valve determines said stopped position of said auxiliary piston means.

10. A pilot-operated hydraulic modulator, according to claim 2, wherein said exhaust valve is a spool valve and said main piston means forms a spool portion of said spool valve.

11. A pilot-operated hydraulic modulator, according to claim 2, wherein said main piston means comprises one of an outer sleeve and spool arranged to slide in a bore and one of an inner sleeve and spool slidable within said one of said outer sleeve and spool.

12. A pilot-operated hydraulic modulator, according to claim 1, wherein said inlet valve is a normally open valve and said exhaust valve is a normally closed valve.

13. A pilot-operated hydraulic modulator, according to claim 12, wherein a valve operated by movement of said auxiliary piston means is a seated valve and a closed position of said seated valve determines said stopped position of said auxiliary piston means.

14. A pilot-operated hydraulic modulator, according to claim 12, wherein said exhaust valve is a spool valve and said main piston means forms a spool portion of said spool valve.

15. A pilot-operated hydraulic modulator, according to claim 1, wherein said main piston means moves in response to said pilot signal pressure into abutment with said auxiliary piston means which in response to an increase in said pilot signal pressure then travels with said main piston means.

16. A pilot-operated hydraulic modulator, according to claim 15, wherein a valve operated by movement of said auxiliary piston means is a seated valve and a closed position of said seated valve determines said stopped position of said auxiliary piston means.

17. A pilot-operated hydraulic modulator, according to claim 15, wherein said exhaust valve is a spool valve and said main piston means forms a spool portion of said spool valve.

18. A pilot-operated hydraulic modulator, according to claim 1, wherein a valve operated by movement of said auxiliary piston means is a seated valve and a closed position of said seated valve determines said stopped position of said auxiliary piston means.

19. A pilot-operated hydraulic modulator, according to claim 18, wherein said exhaust valve is a spool valve and said main piston means forms a spool portion of said spool valve.

20. A pilot-operated hydraulic modulator, according to claim 18, wherein said main piston means comprises one of an outer sleeve and spool arranged to slide in a bore and one of an inner sleeve and spool slidable within said one of said outer sleeve and spool.

21. A pilot-operated hydraulic modulator, according to claim 20, wherein said exhaust valve means is formed by a cooperating valve head and seated members on each of said one of said outer sleeve and spool and said one of said inner sleeve and spool, said exhaust valve means being operable by a stop which limits travel of said one of said inner sleeve and spool in a direction of reducing said pilot signal pressure.

22. A pilot-operated hydraulic modulator, according to claim 1, wherein said exhaust valve is a spool valve and said main piston means forms a spool portion of said spool valve.

23. A pilot-operated hydraulic modulator, according to claim 1, wherein said main piston means comprises one of an outer sleeve and spool arranged to slide in a bore and one of an inner sleeve and spool slidable within said one of said outer sleeve and spool.

24. A pilot-operated hydraulic modulator, according to claim 23, wherein said exhaust valve means is formed by a cooperating valve head and seated members on each of said one of said outer sleeve and spool and said one of said inner sleeve and spool.

25. A pilot-operated hydraulic modulator, according to claim 23, wherein said exhaust valve means is formed by a cooperating valve head and seated members on each of said one of said outer sleeve and spool and said one of said inner sleeve and spool, said exhaust valve means being operable by a stop which limits travel of said one of said inner sleeve and spool in a direction of reducing said pilot signal pressure.

26. A pilot-operated hydraulic modulator, according to claim 1, wherein said biasing means engageable with said main piston means is a spring.

27. A pilot-operated hydraulic modulator, according to claim 26, wherein said biasing means engageable with said auxiliary piston means is a spring.

28. A pilot-operated hydraulic modulator, according to claim 27, wherein said spring engageable with said main piston means is stronger than said spring engageable with said auxiliary piston means.

29. A pilot-operated hydraulic modulator, according to claim 28, wherein said pilot-operated hydraulic modulator further includes a first spacer means positioned intermediate said main piston means and said auxiliary piston means.

30. A pilot-operated hydraulic modulator, according to claim 29, wherein said first spacer means is slotted.

31. A pilot-operated hydraulic modulator, according to claim 30, wherein said first spacer means is carried by said auxiliary piston means.

32. A pilot-operated hydraulic modulator, according to claim 31, wherein said first spacer means and said auxiliary piston means are formed integrally as a single piece.

33. A pilot-operated hydraulic modulator, according to claim 32, wherein said auxiliary piston means includes a stop means secured thereto.

34. A pilot-operated hydraulic modulator, according to claim 33, wherein said stop means is a circular lip.

35. A pilot-operated hydraulic modulator, according to claim 34, wherein said pilot-operated hydraulic modulator further includes a second spacer means positioned intermediate said auxiliary piston means and a fitting forming a fluid delivery port.

36. A pilot-operated hydraulic modulator, according to claim 35, wherein said second spacer means is carried by said auxiliary piston means.

37. A pilot-operated hydraulic modulator, according to claim 36, wherein said second spacer means is slotted.

38. A pilot-operated hydraulic modulator, according to claim 37, wherein said first spacer means and said second spacer means and said auxiliary piston means are formed integrally as a single piece.

39. A pilot-operated hydraulic modulator which includes a provision for each of a supply, a delivery and an exhaust flow of fluid, said pilot-operated hydraulic modulator comprising:

(a) a housing member;
(b) a main piston means disposed for reciprocal movement within said housing member;
(c) a means for producing a pressure balance across said main piston means;
(d) an auxiliary piston means disposed for reciprocal movement within said housing member, said auxiliary piston means moves in response to a predetermined movement of said main piston means;
(e) an inlet valve means operable in response to said reciprocal movement of one of said main piston means and said auxiliary piston means for controlling fluid communication between a supply and a delivery fluid communication port;
(f) an exhaust valve means operable in response to said reciprocal movement by an opposite one of said main piston means and said auxiliary piston means for controlling fluid communication between said delivery and an exhaust fluid communication port;
(g) biasing means engageable with said auxiliary piston means for urging said auxiliary piston means in a predetermined direction;
(h) means for supplying a pilot signal pressure to said main piston means, said main piston means moving in response to said pilot signal pressure and during at least a portion of its movement said main piston means controls movement of said auxiliary piston means away from a stopped position toward which said auxiliary piston means is biased; and
(i) a biasing means engageable with one end of said main piston means and pilot signal pressure and said biasing means act on said one end of said main piston means in opposition to a supply pressure acting on an opposite end of said main piston means.

40. A pilot-operated hydraulic modulator, according to claim 39, wherein said supply pressure acts on both ends of said auxiliary piston means.

41. A pilot-operated hydraulic modulator, according to claim 39, wherein said main piston means moves in response to said pilot signal pressure into abutment with said auxiliary piston means which in response to an increase in said pilot signal pressure then travels with said main piston means.

42. A pilot-operated hydraulic modulator, according to claim 39, wherein a valve operated by movement of said auxiliary piston means is a seated valve and a closed position of said seated valve determines said stopped position of said auxiliary piston means.

43. A pilot-operated hydraulic modulator, according to claim 39, wherein said exhaust valve is a spool valve and said main piston means forms a spool portion of said spool valve.

* * * * *